US012679343B2

(12) United States Patent
Kim

(10) Patent No.: US 12,679,343 B2
(45) Date of Patent: Jul. 14, 2026

(54) APPARATUS FOR ASSISTING DRIVING OF VEHICLE AND METHOD THEREOF

(71) Applicant: HL Klemove Corp., Incheon (KR)

(72) Inventor: Taehan Kim, Anyang-si (KR)

(73) Assignee: HL Klemove Corp., Incheon (KR)

( * ) Notice: Subject to any disclaimer, the term of this patent is extended or adjusted under 35 U.S.C. 154(b) by 311 days.

(21) Appl. No.: 17/835,128

(22) Filed: Jun. 8, 2022

(65) Prior Publication Data

US 2022/0388503 A1 Dec. 8, 2022

(30) Foreign Application Priority Data

Jun. 8, 2021 (KR) ........................ 10-2021-0074406

(51) Int. Cl.
*B60W 30/09* (2012.01)
*B60W 10/20* (2006.01)
(Continued)

(52) U.S. Cl.
CPC ............ *B60W 30/09* (2013.01); *B60W 10/20* (2013.01); *B60W 30/0956* (2013.01); *B60W 30/18163* (2013.01); *B60W 40/04* (2013.01); *B60W 50/14* (2013.01); *G06V 20/58* (2022.01); *B60W 2050/143* (2013.01); *B60W 2050/146* (2013.01);
(Continued)

(58) Field of Classification Search
CPC .. B60W 30/09; B60W 10/20; B60W 30/0956; B60W 30/18163; B60W 40/04; B60W 50/14; B60W 2554/402; B60W 2554/4041; B60W 2554/80;
(Continued)

(56) References Cited

U.S. PATENT DOCUMENTS

2016/0144859 A1* 5/2016 Yoo ................... B60W 30/0956
701/25
2016/0152182 A1* 6/2016 Aoki ................. B60W 30/0956
340/435
(Continued)

FOREIGN PATENT DOCUMENTS

KR 10-2020-0094629 A 8/2020
KR 10-2020-0120082 A 10/2020

OTHER PUBLICATIONS

KR OA dated Jul. 22, 2024.

*Primary Examiner* — Anne Marie Antonucci
*Assistant Examiner* — Patrick M Brady
(74) *Attorney, Agent, or Firm* — Harvest IP Law, LLP

(57) ABSTRACT

Disclosed herein an apparatus for assisting driving of a vehicle includes a camera installed in the vehicle, having a rear field of view of the vehicle, and obtaining image data; and a controller configured to process the image data; wherein the controller is configured to identify a rear object that interferes with a driving of the vehicle based on processing the image data, control at least one of a display device and an audio device of the vehicle to output a message for inducing a lane change of the vehicle based on an expected collision time remaining until a collision between the vehicle and the rear object being less than or equal to a first reference time, and control a steering device of the vehicle to apply a first torque for performing the lane change of the vehicle based on the expected collision time being less than or equal to a second reference time that is smaller than the first reference time.

15 Claims, 9 Drawing Sheets

(51) Int. Cl.

| | |
|---|---|
| *B60W 30/095* | (2012.01) |
| *B60W 30/18* | (2012.01) |
| *B60W 40/04* | (2006.01) |
| *B60W 50/14* | (2020.01) |
| *G06V 20/58* | (2022.01) |

(52) U.S. Cl.
CPC . *B60W 2420/403* (2013.01); *B60W 2510/202* (2013.01); *B60W 2554/402* (2020.02); *B60W 2554/4041* (2020.02); *B60W 2554/80* (2020.02)

(58) Field of Classification Search
CPC ..... B60W 2050/143; B60W 2050/146; B60W 2420/403; B60W 2510/202; G06V 20/58
See application file for complete search history.

(56) References Cited

U.S. PATENT DOCUMENTS

| | | | | |
|---|---|---|---|---|
| 2016/0332568 | A1* | 11/2016 | Kim | B60Q 1/544 |
| 2019/0088138 | A1* | 3/2019 | Kang | B60W 10/20 |
| 2019/0308617 | A1* | 10/2019 | Groult | B60Q 1/543 |
| 2021/0188260 | A1* | 6/2021 | Jung | B60W 30/09 |
| 2021/0261133 | A1* | 8/2021 | Sakayori | B60W 30/18163 |
| 2021/0380102 | A1* | 12/2021 | Kim | B60W 10/20 |
| 2022/0185309 | A1* | 6/2022 | Kang | B60W 30/095 |

* cited by examiner

APPARATUS FOR ASSISTING DRIVING OF VEHICLE AND METHOD THEREOF

CROSS-REFERENCE TO RELATED APPLICATION(S)

This application is based on and claims priority under 35 U.S.C. § 119 to Korean Patent Application No. 10-2021-0074406, filed on Jun. 8, 2021 in the Korean Intellectual Property Office, the disclosure of which is incorporated herein by reference in its entirety.

TECHNICAL FIELD

The disclosure relates to an apparatus for assisting driving of a vehicle, and more particularly, to an apparatus and method for assisting driving of a vehicle capable of identifying icing on a road in front of the vehicle.

BACKGROUND

In general, vehicles are the most common means of transportation in modern society, and the number of people using vehicles is increasing. The development of vehicle technologies has advantages such as making it easier to travel long-distance and making life easier. However, in places with high population density such as Korea, the development of vehicle technologies causes serious traffic congestion, thereby deteriorating road traffic conditions.

Recently, to reduce the burden on a driver and increase convenience, a study for a vehicle equipped with an Advanced Driver Assist System (ADAS) that dynamically provides information on a vehicle condition, a driver condition, and a surrounding environment has been actively ongoing.

For example, ADAS mounted on vehicles includes a Forward Collision Avoidance (FCA), an Autonomous Emergency Brake (AEB), and a Driver Attention Warning (DAW), and the like. Such a system is a system for judging a collision risk with an object in a driving situation of a vehicle, and avoiding collision and providing a warning through emergency braking in a collision situation.

SUMMARY

An aspect of the disclosure is to provide an apparatus for assisting driving of a vehicle capable of preventing a rear-end collision of a vehicle or reducing an impact caused by the rear-end collision, and a method thereof.

Additional aspects of the disclosure will be set forth in part in the description which follows and, in part, will be obvious from the description, or may be learned by practice of the disclosure.

In accordance with an aspect of the disclosure, an apparatus for assisting driving of a vehicle includes a camera installed in the vehicle, having a rear field of view of the vehicle, and obtaining image data; and a controller configured to process the image data; wherein the controller is configured to identify a rear object that interferes with a driving of the vehicle based on processing the image data, control at least one of a display device and an audio device of the vehicle to output a message for inducing a lane change of the vehicle based on an expected collision time remaining until a collision between the vehicle and the rear object being less than or equal to a first reference time, and control a steering device of the vehicle to apply a first torque for performing the lane change of the vehicle based on the expected collision time being less than or equal to a second reference time that is smaller than the first reference time.

The controller may be further configured to apply the first torque without outputting the message for inducing the lane change of the vehicle based on the expected collision time being less than or equal to the second reference time.

The controller may be further configured to control the steering device of the vehicle to apply a second torque greater than the first torque based on the expected collision time being less than or equal to a third reference time that is smaller than the second reference time.

The controller may be further configured to identify a free space on which the vehicle may travel in response to that the expected collision time is less than or equal to the first reference time, and control at least one of the display device and the audio device of the vehicle to output the message for inducing the lane change toward the free space.

The controller may be configured to control the steering device of the vehicle to apply the first torque for performing the lane change toward the free space in response to that the expected collision time is less than or equal to the second reference time.

The controller may be further configured to identify a type of the rear object that interferes with the driving of the vehicle based on processing the image data, and change at least one of the first reference time and the second reference time based on the type of the rear object.

The controller may be configured to increase at least one of the first reference time and the second reference time as a size of the rear object increases.

In accordance with another aspect of the disclosure, a method of assisting driving of a vehicle includes obtaining image data by a camera installed in the vehicle, the camera having a rear field of view of the vehicle; identifying a rear object that interferes with a driving of the vehicle based on processing the image data; outputting a message for inducing a lane change of the vehicle based on an expected collision time remaining until a collision between the vehicle and the rear object being less than or equal to a first reference time; and applying a first torque for performing the lane change of the vehicle based on the expected collision time being less than or equal to a second reference time that is smaller than the first reference time.

Applying of the first torque may further include applying the first torque without outputting the message for inducing the lane change of the vehicle based on the expected collision time being less than or equal to the second reference time.

The method may further include applying a second torque greater than the first torque based on the expected collision time being less than or equal to a third reference time that is smaller than the second reference time.

Outputting the message may further include identifying a free space on which the vehicle may travel in response to that the expected collision time is less than or equal to the first reference time, and outputting the message for inducing the lane change towards the free space.

Applying the first torque may further include applying the first torque for performing the lane change toward the free space in response to that the expected collision time is less than or equal to the second reference time.

The method may further include identify a type of the rear object that interferes with the driving of the vehicle based on processing the image data, and changing at least one of the first reference time and the second reference time based on the type of the rear object.

Changing the at least one of the first reference time and the second reference time may further include increasing at least one of the first reference time and the second reference time as a size of the rear object increases.

In accordance with another aspect of the disclosure, a computer-readable recording medium storing instructions, the instructions includes obtaining image data by a camera installed in a vehicle and having a rear field of view of the vehicle; identifying a rear object that interferes with a driving of the vehicle based on processing the image data; outputting a message for inducing a lane change of the vehicle based on an expected collision time remaining until a collision between the vehicle and the rear object being less than or equal to a first reference time; and applying a first torque for performing the lane change of the vehicle based on the expected collision time being less than or equal to a second reference time that is smaller than the first reference time.

The instruction may further include applying the first torque without outputting the message for inducing the lane change of the vehicle based on the expected collision time being less than or equal to the second reference time.

The instruction may further include applying a second torque greater than the first torque based on the expected collision time being less than or equal to a third reference time that is smaller than the second reference time.

The instruction may further include identifying a free space on which the vehicle may travel in response to that the expected collision time is less than or equal to the first reference time, and outputting the message for inducing the lane change towards the free space.

The method may further include applying the first torque for performing the lane change toward the free space in response to that the expected collision time is less than or equal to the second reference time.

The instruction may further include identifying a type of the rear object that interferes with the driving of the vehicle based on processing the image data, and changing at least one of the first reference time and the second reference time based on the type of the rear object.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
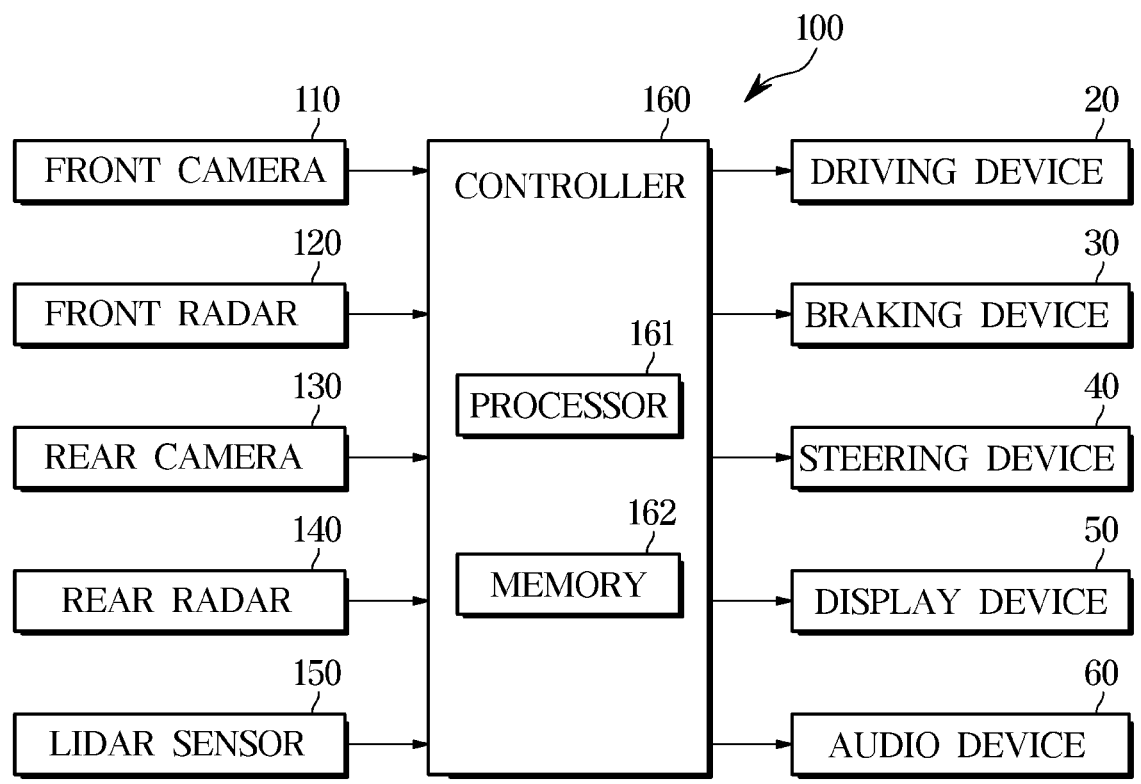
FIG. 1 shows a configuration of a vehicle and an apparatus for assisting driving according to an embodiment of the disclosure.

Like numerals refer to like elements throughout the specification. Not all elements of embodiments of the disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a member is "on" another member, the member may be directly on the other member or a third member may be disposed therebetween.

Terms such as "~ unit", "~ group", "~ block", "~ member", and "~ module" used in the specification may be implemented in software or hardware. Terms such as "~ unit", "~ group", "~ block", "~ member", and "~ module" may refer to a unit that processes at least one function or operation. In addition, terms such as "~ unit", "~ group", "~ block", "~ member", and "~ module" are used in at least one piece of hardware such as a field-programmable gate array (FPGA)/application specific integrated circuit (ASIC), or at least one software or processor stored in a memory.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, operating principles and embodiments of the disclosure will be described with reference to the accompanying drawings.

Figure 2:
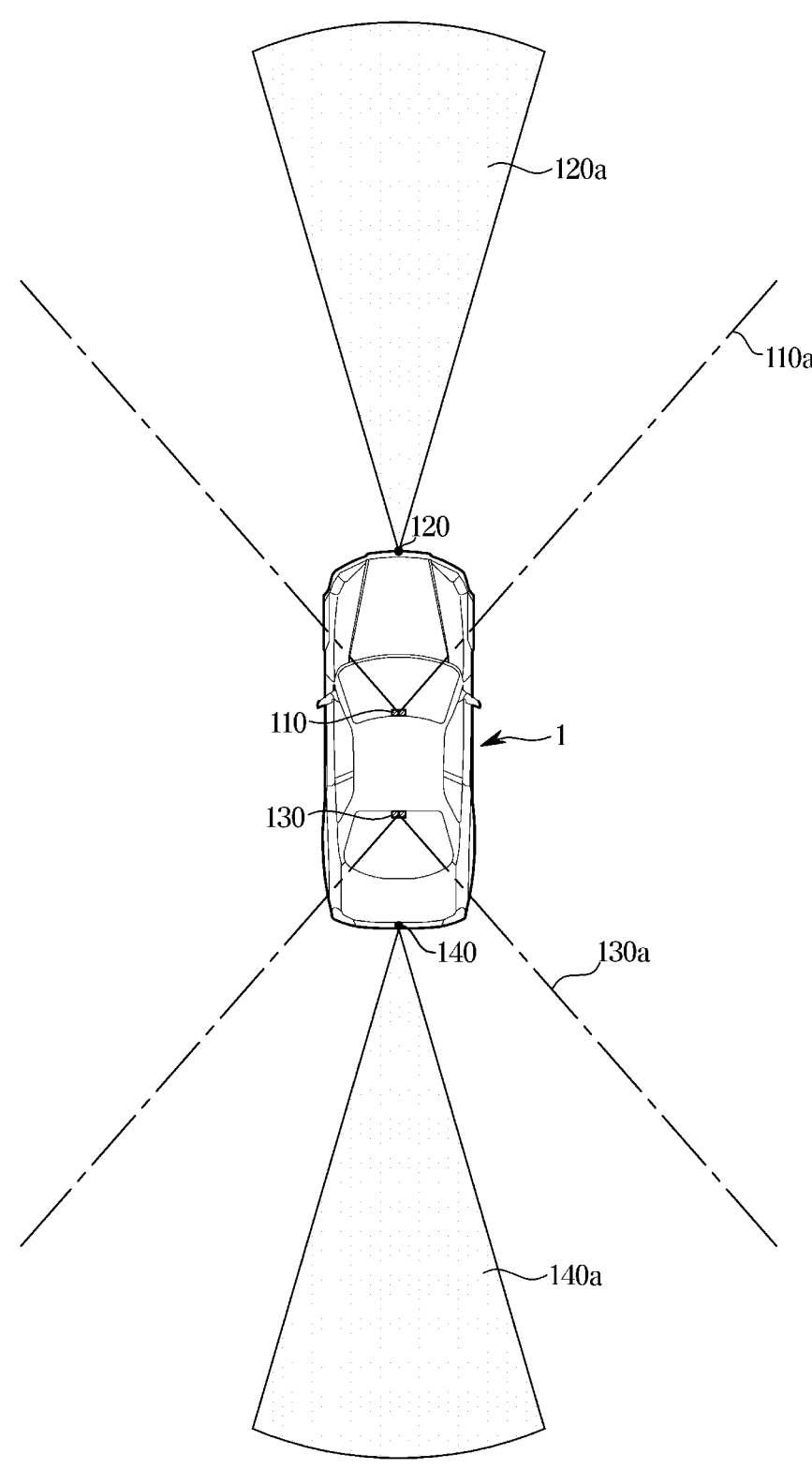
FIG. 2 shows field of views of a camera and a radar included in a driver assistance device according to an embodiment of the disclosure.

FIG. 1 shows a configuration of a vehicle according to an embodiment of the disclosure. FIG. 2 shows field of views of a camera and a radar included in an apparatus for assisting driving according to an embodiment of the disclosure.

As shown in FIG. 1, a vehicle 1 includes a driving device 20, a braking device 30, a steering device 40, a display device 50, an audio device 60, and an apparatus for assisting driving 100. They may communicate with each other via a vehicle communication network (NT). For example, the electronic devices 20, 30, 40, 50, 60, and 100 included in the vehicle 1 may exchange data through Ethernet, Media Oriented Systems Transport (MOST), Flexray, Controller Area Network (CAN), and Local Interconnect Network (LIN), and the like.

The driving device 20 moves the vehicle 1 and may include, for example, an engine, an engine management system (EMS), a transmission, and a transmission control unit (TCU). The engine generates power for driving the vehicle 1, and the EMS may control the engine in response to a driver's intention to accelerate through an accelerator pedal or a request from the apparatus for assisting driving 100. The transmission decelerates-transmits the power generated by the engine to wheels of the vehicle, and the TCU may control the transmission in response to a driver's shift instruction through a shift lever and/or a request from the apparatus for assisting driving 100.

The braking device 30 stops the vehicle 1, and may include, for example, a brake caliper and an electronic brake control module (EBCM). The brake caliper may decelerate the vehicle 1 or stop the vehicle 1 by using friction with a brake disc, and the EBCM may control the brake caliper in response to a driver's intention to brake through a brake pedal and/or a request from the apparatus for assisting driving 100. For example, the EBCM receives a deceleration request including a deceleration degree from the apparatus for assisting driving 100, and electrically or hydraulically controls the brake caliper to decelerate the vehicle 1 depending on the requested deceleration degree.

The steering device 40 may include an Electronic Power Steering (EPS) control module. The steering device 40 may change a driving direction of the vehicle 1, and the EPS control module may assist the operation of the steering device 40 so that a driver may easily manipulate a steering wheel in response to a driver's intention to steer through the steering wheel. Furthermore, the EPS control module may control the steering device in response to a request from the apparatus for assisting driving 100. For example, the EPS control module may receive a steering request including a steering torque from the apparatus for assisting driving 100 and control the steering device to steer the vehicle 1 depending on the requested steering torque.

The display device 50 may include a cluster, a head-up display, a center fascia monitor, and the like, and may provide various information and entertainment to a driver through images and sounds. For example, the display device 50 may provide driving information of the vehicle 1, a route to a destination, and a warning message to the driver.

The audio device 60 may include a plurality of speakers, and may provide various information and entertainment to the driver through sound. For example, the audio device 60 may provide driving information of the vehicle 1, a route to a destination, and a warning message to the driver.

The apparatus for assisting driving 100 may provide various functions to the driver. For example, the apparatus for assisting driving 100 may include a lane departure warning (LDW), a lane keeping assist (LKA), a high beam assist (HBA), an autonomous emergency braking (AEB), a traffic sign recognition (TSR), an adaptive cruise control (ACC), and a blind spot detection (BSD), and the like.

The apparatus for assisting driving 100 includes a front camera 110, a front radar 120, a rear camera 130, a rear radar 140, a light detection and ranging (lidar) sensor 150, and a controller 160.

The front camera 110, the front radar 120, the rear camera 130, the rear radar 140, the lidar sensor 150, and the controller 160 may be provided separately from each other. For example, the controller 160 may be installed in a housing separated from the housing of the front camera 110, the housing of the front radar 120, the rear side of the housing of the rear camera 130, the housing of the radar 140, and the housing of the lidar sensor 150. The controller 160 may exchange data with the front camera 110, the front radar 120, the rear camera 130, the rear radar 140, or the lidar sensor 150 through a wide bandwidth network.

The front camera 110 may have a field of view 110a facing the front of the vehicle 1 as shown in FIG. 2. The front camera 110 may be installed, for example, on a front windshield of the vehicle 1.

The front camera 110 may include a plurality of lenses and an image sensor. The image sensor may include a plurality of photodiodes that convert light into an electrical signal, and the plurality of photodiodes may be arranged in a two-dimensional matrix.

The front camera 110 may photograph the front of the vehicle 1 and obtain image data of the front of the vehicle 1. The image data in front of the vehicle 1 may include information regarding other vehicles or pedestrians or cyclists positioned in front of the vehicle 1 or lanes (markers for distinguishing lanes). Furthermore, the image data in front of the vehicle 1 may include information regarding a free space on which the vehicle 1 may travel.

The front camera 110 may be electrically connected to the controller 160. For example, the camera 110 may be connected to the controller 160 through the NT, connected to the controller 160 through a hard wire, or connected to the controller 160 through a printed circuit board (PCB). The front camera 110 may transmit the image data in front of the vehicle 1 to the controller 160.

The controller 160 may process the image data received from the front camera 110, and identify other vehicles or pedestrians or cyclists or lanes (markers for distinguishing lanes) or free space located in front of the vehicle 1 from the image data.

The front radar 120 may have a field of sensing 120a facing the front of the vehicle 1 as shown in FIG. 2. The front radar 120 may be installed, for example, on a grille or a bumper of the vehicle 1.

The front radar 120 may include a transmission antenna (or a transmission antenna array) that radiates a transmission wave toward the front of the vehicle 1, and a reception antenna (or a reception antenna array) that receives the reflected wave reflected by an object. The front radar 120 may obtain radar data from the transmitted wave transmitted by the transmission antenna and the reflected wave received by the reception antenna. The radar data may include relative positions and relative speeds of other vehicles or pedestrians or cyclists located in front of the vehicle 1. The front radar 120 may calculate a state distance to the object based on phase difference (or time difference) between the transmitted wave and the reflected wave, and calculate the relative speed of the object based on frequency difference between the transmitted wave and the reflected wave.

The front radar 120 may be connected to the controller 160 through, for example, the NT, or the hard wire, or the PCB. The front radar 120 may transmit the radar data to the controller 160.

The controller 160 may process the radar data received from the front radar 120, and identify the relative position and the relative speed with respect to any other vehicle or a pedestrian or a cyclist positioned in front of the vehicle 1 from the radar data.

The rear camera 130 may have a field of view 130a facing the rear of the vehicle 1 as shown in FIG. 2. The rear camera 130 may be installed in, for example, a rear window or a tail gate or a truck lid of the vehicle 1.

A structure of the rear camera 130 may be the same as that of the front camera 110.

The rear camera 130 may photograph the rear of the vehicle 1 and obtain image data of the rear of the vehicle 1. The image data of the rear of the vehicle 1 may include information regarding other vehicles or pedestrians or cyclists or lanes located behind the vehicle 1.

The rear camera 130 may be electrically connected to the controller 160, and may transmit the image data of the rear of the vehicle 1 to the controller 160. The controller 160 may process the image data received from the rear camera 130 and identify other vehicles, pedestrians, cyclists, or lanes located behind the vehicle 1 from the image data.

The rear radar 140 may have a field of sensing 140a facing the rear of the vehicle 1 as shown in FIG. 2. The rear radar 140 may be installed in, for example, the tailgate or the trunk lid of the vehicle 1.

A structure of the rear radar 140 may be the same as that of the front radar 120.

The rear radar 140 may obtain radar data of the rear of the vehicle 1, and the radar data is the relative position and the relative speed of other vehicles or pedestrians or cyclists located in the rear of the vehicle 1.

The rear radar 140 may be electrically connected to the controller 160, and may transmit the radar data of the rear of the vehicle 1 to the controller 160. The controller 160 may process the radar data received from the rear radar 140 and identify the relative position and relative speed of any other vehicle or a pedestrian or a cyclist located in the rear of the vehicle 1 from the radar data.

The lidar sensor 150 may have, for example, a field of view facing all directions around the vehicle 1. The lidar sensor 150 may be installed, for example, on a roof of the vehicle 1.

The lidar sensor 150 may include a light source (e.g., a light emitting diode or a light emitting diode array or a laser diode or a laser diode array) that emits light (e.g., infrared light) and a light receiver that receives the light reflected by an object (e.g., a photodiode or a photodiode array). Furthermore, if necessary, the lidar sensor 150 may further include a driving device for rotating the light source and the light receiver. During rotation, the lidar sensor 150 may receive lidar data by emitting light and receiving the light reflected from the object. The lidar data may include the relative positions and relative speeds of other vehicles or pedestrians or cyclists around the vehicle 1.

The lidar sensor 150 may be connected to the controller 160 through, for example, the NT or the hard wire or the PCB. The lidar sensor 150 may transmit lidar data to controller 160.

The controller 160 may process the lidar data received from the lidar sensor 150, and identify the relative position and relative speed with respect to other vehicles or pedestrians or cyclists located around the vehicle 1 from the lidar data.

The controller 160 may be electrically connected to the front camera 110, the front radar 120, the rear camera 130, the rear radar 140, and the lidar sensor 150. Furthermore, controller 160 may be connected to a navigation device 10, the driving device 20, the braking device 30, the steering device 40, the display device 50, and the audio device 60 through the NT.

The controller 160 includes a processor 161 and a memory 162.

The processor 161 may process the image data, the radar data, and the lidar data, and output a driving signal, a braking signal, a steering signal and a warning signal for controlling the driving device 20, the braking device 30, the steering device 40, the display device 50, and the audio device 60. For example, the processor 161 may include an image processor, a digital signal processor (DSP), and/or a micro control unit (MCU).

The processor 161 may identify objects around the vehicle 1 (e.g., other vehicles, pedestrians, cyclists, etc.), lanes of the road, and free space based on the image data, the radar data, and the lidar data.

The processor 161 may identify relative positions (angles to distances and driving directions from the vehicle) and classification (e.g., whether the objects are other vehicles, pedestrians, or cyclists, etc., or not) of the objects in front of the vehicle 1 based on the image data. The processor 161 may identify the relative positions and relative speeds of the objects in front of the vehicle 1 based on the radar data and the lidar data. Furthermore, the processor 161 may match the objects identified based on the radar data with the objects identified based on the image data and the objects identified based on the lidar data, and obtain the classification, the relative positions, and the relative speeds of the objects around the vehicle.

The processor 161 may estimate a location of the vehicle 1 using a high-definition map (HD map), image data, radar data, and lidar data stored in the memory 162. For example, the processor 161 may identify a distance to a plurality of landmarks of the HD map based on the lidar data, and identify an absolute position of the vehicle 1 based on the distance to the plurality of landmarks.

The processor 161 may also project the objects around the vehicle 1 on the HD map based on the image data, the radar data, and the lidar data. The processor 161 may project the surrounding objects of the vehicle 1 on the HD map based on the absolute position of the vehicle 1 and the relative positions of the objects.

The processor 161 may evaluate a risk of collision between the vehicle 1 and the surrounding objects based on the relative positions and relative speeds of the surrounding objects of the vehicle 1. For example, the processor 161 may calculate a Time to Collision (TTC) (or a Distance to Collision (TTD) between the vehicle 1 and the surrounding objects based on the position (distance) and relative speed of the surrounding object of the vehicle 1, and evaluate the risk of collision between the vehicle 1 and the surrounding objects based on the TTC. The processor 161 may determine that the risk of collision is high as the TTC is smaller.

The processor 161 may select a target object from among surrounding objects of the vehicle 1 based on the risk of collision. For example, the processor 161 may select the target object from among the vehicle 1 based on the TTC between the vehicle 1 and the surrounding objects.

The processor 161 may generate a driving signal, a braking signal, and a steering signal based on the risk of collision with the target object. For example, the processor 161 may warn a driver of a collision or transmit the braking signal to the braking device 30 based on a comparison between a reference time and the TTC between the vehicle 1 and the target objects. Furthermore, the processor 161 may transmit a steering signal to the steering device 40 to avoid a collision with the target object based on the comparison between the reference time and the TTC between the vehicle 1 and the target objects.

The memory 162 may include a program and/or data for the processor 161 to process the image data, a program and/or data for the processor 161 to process the radar data, and a program and/or data for the processor 161 to generate a drive signal and/or a braking signal and/or a steering signal. Furthermore, the memory 162 may store the HD map.

The memory 162 may store temporarily the image data received from the camera 110 and/or the radar data received from the radars 120 and 130, and store temporarily the processing result of the image data and/or radar data of the processor 161.

The memory 162 includes not only volatile memories such as a static random access memory (S-RAM) and a dynamic random-access memory (D-RAM), but also non-volatile memory such as a flash memory, a read-only memory (ROM), an erasable programmable read only memory (EPROM), and the like.

As such, the controller 160 may transmit the braking signal to the braking device 30 or the steering signal to the steering device 40 based on whether the collision with the target object is predicted.

Figure 3:
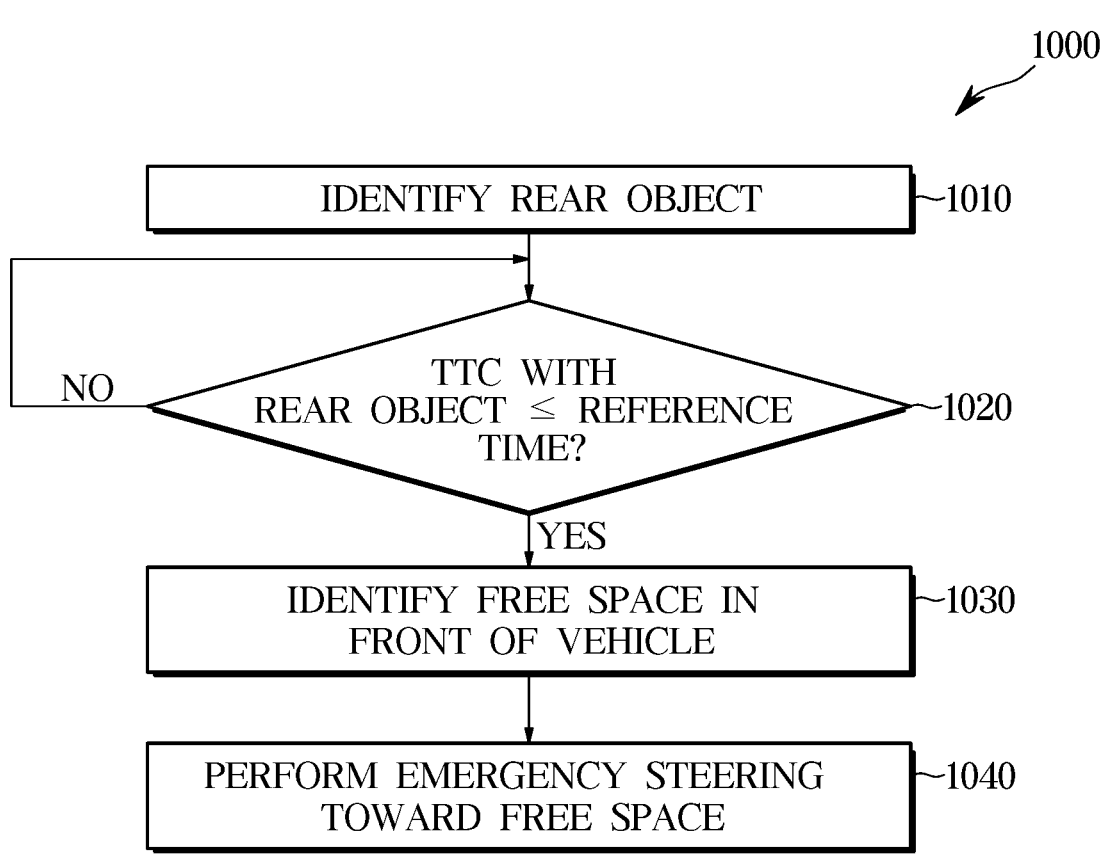
FIG. 3 shows a rear collision avoidance of an apparatus for assisting driving according to an embodiment of the disclosure.

FIG. 3 shows a rear-end collision avoidance 1000 of an apparatus for assisting driving according to an embodiment of the disclosure.

Referring to FIG. 3, the apparatus for assisting driving 100 identifies a rear object of the vehicle 1 (1010).

While the vehicle 1 is driving or stopped, the rear camera 130 of the apparatus for assisting driving 100 may photograph the rear of the vehicle 1. The controller 160 of the apparatus for assisting driving 100 may receive the image data from the rear camera 130. The controller 160 may identify the objects located behind and/or around the vehicle 1 based on the image data.

While the vehicle 1 is driving or stopped, the rear radar 140 of the apparatus for assisting driving 100 may obtain the radar data of the rear of the vehicle 1. The controller 160 may obtain the radar data from the rear radar 140. The controller 160 may identify the objects located behind and/or around the vehicle 1 based on the radar data.

The controller 160 may identify the objects located behind the vehicle 1 based on the image data and/or the radar data. For example, the controller 160 may identify a common object between the objects identified based on image data and the objects identified based on the radar data.

The apparatus for assisting driving 100 identifies whether the TTC with the rear object is equal to or less than the reference time (1020).

The apparatus for assisting driving 100 may identify the relative position (distance and direction from the vehicle) and the relative speed of the rear object of the vehicle 1.

The controller 160 may identify the relative positions of the objects located at the rear of the vehicle 1 based on the image data, and identify the relative speeds of the objects behind the vehicle 1 based on a plurality of consecutive image data. For example, the controller 160 may identify the relative positions of the objects based on positions (coordinates of pixels occupied by an object in an image frame) and sizes (the number of pixels occupied by an object in an image frame) of the objects in an image based on the image data. Furthermore, the controller 160 may identify a lateral relative speed of the objects based on a change in the positions of the object (coordinates of pixels occupied by the object in the image frame) in the image by the plurality of consecutive image data, and identify a longitudinal relative speed of the objects based on a change in the sizes of the object (the number of pixels occupied by the object in the image frame). Here, the lateral direction may refer to a direction perpendicular to the driving direction of the vehicle 1, and the longitudinal direction may refer to a direction parallel to the driving direction of the vehicle 1.

Furthermore, the controller 160 may identify the relative positions and relative speeds of the objects behind and/or around the vehicle 1 based on the radar data. For example, the controller 160 may identify the relative positions of the objects located in front and/or around the vehicle 1 based on a time until the radio wave reflected from the object is received and an angle at which the radio wave is received. Furthermore, the controller 160 may identify the relative speeds of the objects behind and/or around the vehicle 1 based on changes in frequency (Doppler Effect) of radio waves reflected from the object.

Furthermore, the controller 160 may identify the relative positions and the relative speeds of the objects behind and/or around the vehicle 1 based on the image data and the radar data. For example, the controller 160 may determine the lateral relative position and the lateral relative speed of the object based on the image data, and may determine the longitudinal relative position and the longitudinal relative speed of the object based on the radar data.

The controller 160 may determine the TTC between the vehicle 1 and the target object based on the relative positions and relative speeds of the rear objects. For example, the controller 160 may calculate, based on the distance to the rear vehicle 2 and the relative speed of the rear vehicle 2, the TTC between the vehicle 1 and the rear vehicle 2.

The controller 160 may also compare the TTC with the rear object with the reference time, and identify whether the TTC with the rear object is less than or equal to the reference time. The reference time may be set experimentally or empirically. For example, the reference time may set based on a minimum time required to avoid a collision by a general driver's braking or steering or a minimum time required to avoid a collision by automatic braking or automatic steering of the apparatus for assisting driving 100, etc.

In response to that the TTC with the rear object is not less than or equal to the reference time (No in 1020), the apparatus for assisting driving 100 identifies the rear object again, and identify whether the TTC between the vehicle 1 and the rear object is less than or equal to the reference time.

In response to that the TTC with the rear object is less than or equal to the reference time (YES in 1020), the apparatus for assisting driving 100 identifies the free space in front of the vehicle 1 (1030).

The controller 160 may detect an object located on sides (front right, front left, rear right, rear left) of the vehicle 1 based on the image data and/or the radar data and/or the lidar data. Furthermore, the controller 160 may obtain the relative position (distance and direction) and relative speed of the lateral object of the vehicle 1.

The controller 160 may identify the free space based on the relative position (distance and direction) and the relative speed of the lateral object of the vehicle 1. For example, in response to that the object located on the sides of the vehicle 1 is not identified, the controller 160 may identify both the left and right sides of the vehicle 1 as free space. The controller 160 may identify the left side of the vehicle 1 as the free space when the object located in the front right side of the vehicle 1 is identified. The controller 160 may identify the left side of the vehicle 1 as the free space when the object located in the right rear side of the vehicle 1 is identified and the relative speed of the right rear object has a positive value. Furthermore, in response to that the object located in the right rear of the vehicle 1 is identified and the relative speed of the right rear object has a negative value, the controller 160 may identify the left and right sides of the vehicle 1 as the free space.

The apparatus for assisting driving 100 performs an emergency steering toward the free space (1040).

The controller 160 may transmit the steering signal toward the free space to the steering device 40 in order to avoid the collision with the object behind the vehicle 1. Accordingly, the vehicle 1 is changed into a lane of a free space.

As described above, the apparatus for assisting driving 100 may identify the risk of rear collision and control the steering device 40 to steer toward the free space based on the risk of rear collision.

Figure 4:
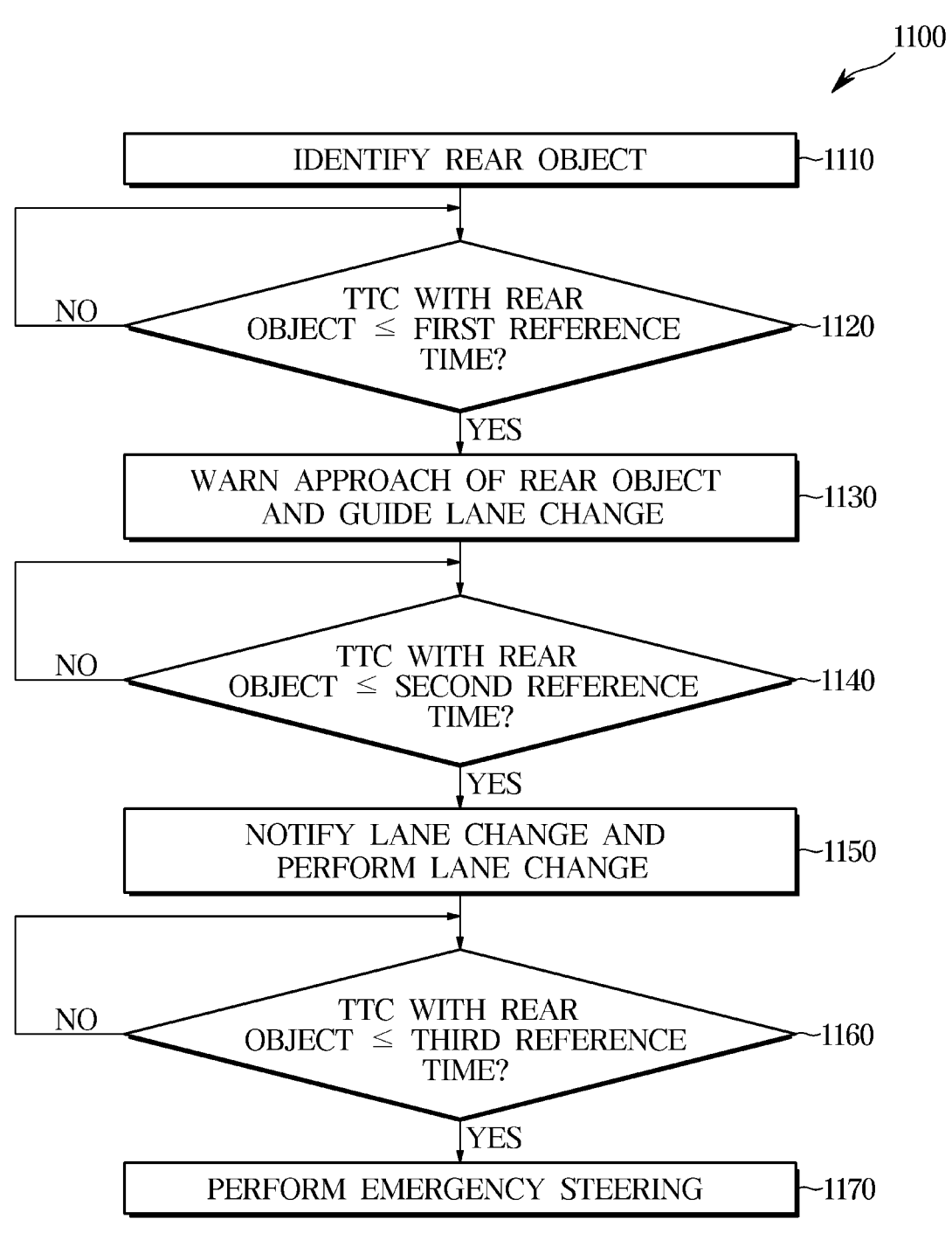
FIG. 4 shows a rear collision avoidance of an apparatus for assisting driving according to an embodiment of the disclosure.
Figure 5:
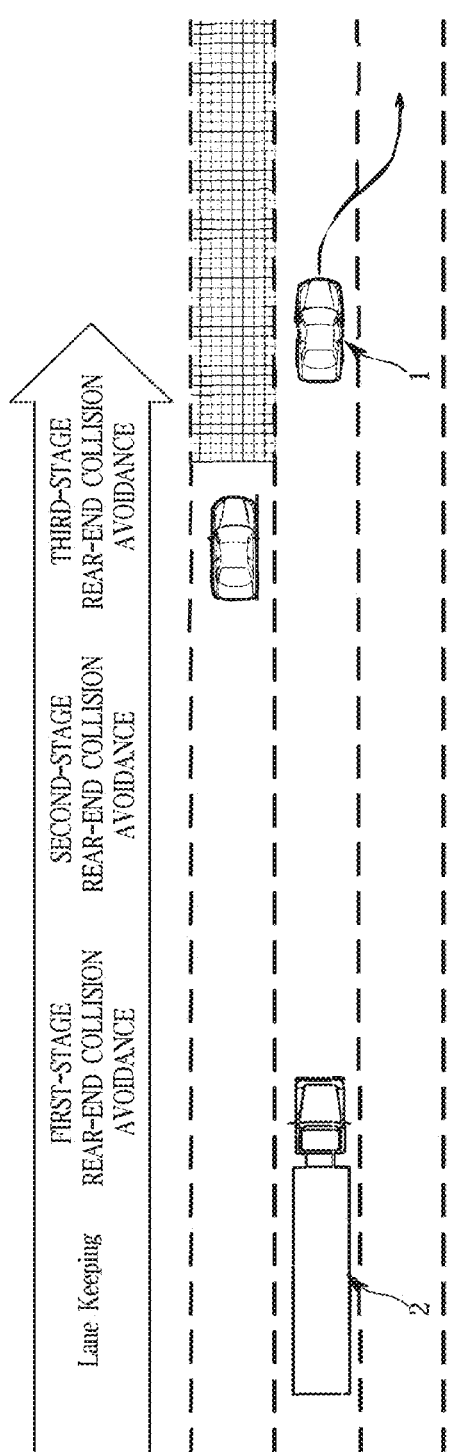
FIG. 5 shows a first-stage of a rear-end collision avoidance of an apparatus for assisting driving according to an embodiment of the disclosure.
Figure 6:
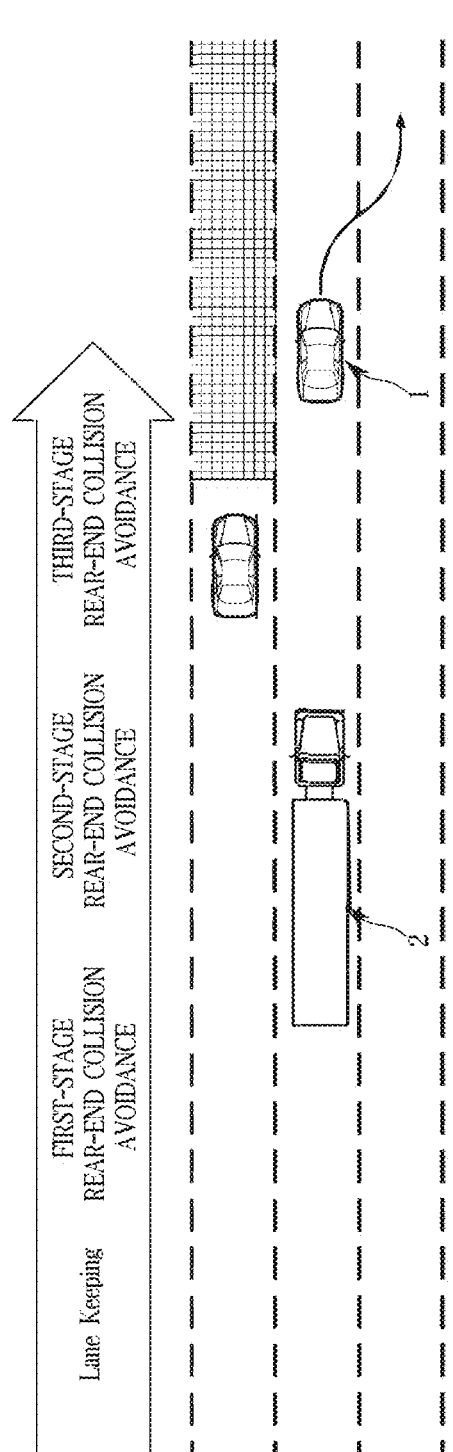
FIG. 6 shows a second-stage of the rear-end collision avoidance of the apparatus for assisting driving according to an embodiment of the disclosure.
Figure 7:
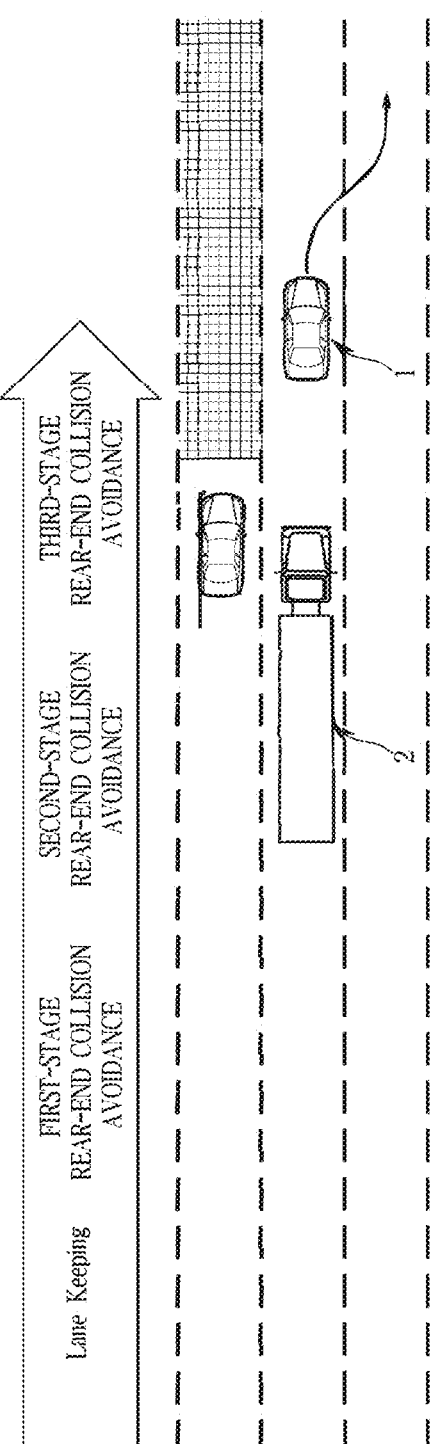
FIG. 7 shows a third-stage of the rear-end collision avoidance of the apparatus for assisting driving according to an embodiment of the disclosure.

FIG. 4 shows a rear-end collision avoidance of the apparatus for assisting driving according to an embodiment of the disclosure. FIG. 5 shows a first-stage of the rear-end collision avoidance of the apparatus for assisting driving according to an embodiment of the disclosure. FIG. 6 shows a second-stage of the rear-end collision avoidance of the apparatus for assisting driving according to an embodiment of the disclosure. FIG. 7 shows a third-stage of the rear-end collision avoidance of the apparatus for assisting driving according to an embodiment of the disclosure.

Referring to FIG. 4, the apparatus for assisting driving 100 identifies a rear object of the vehicle 1 (1110).

Operation 1110 may be the same as operation 1010 illustrated in FIG. 3.

The apparatus for assisting driving 100 identifies whether the TTC with the rear object is less than or equal to a first reference time (1120).

Operation 1120 may be similar to operation 1020 illustrated in FIG. 3. For example, the controller 160 may determine the TTC between the vehicle 1 and the rear vehicle 2 based on the relative position and the relative speed of the rear vehicle 2. The controller 160 may compare the TTC with the rear vehicle 2 with the reference time, and determine whether the TTC with the rear vehicle 2 is less than or equal to the first reference time. The first reference time may be set experimentally or empirically.

In response to that the TTC with the rear object is greater than the first reference time (NO in 1120), the apparatus for assisting driving 100 may identify the relative position (distance and direction) and the relative speed of the rear vehicle 2 again, and identify again whether the TTC with the rear vehicle 2 is less than or equal to the first reference time.

In response to that the TTC with the rear object is less than or equal to the first reference time (YES in 1120), the apparatus for assisting driving 100 warns approach of the rear object and induces a lane change (1130).

For example, when the TTC with the rear vehicle 2 is less than or equal to the first reference time, the controller 160 may predict a collision between the vehicle 1 and the rear vehicle 2. The controller 160 may induce the lane change in order to prevent the collision between the vehicle 1 and the rear vehicle 2.

The controller 160 may control the display device 50 and/or the audio device 60 to warn of a collision between the vehicle 1 and the rear vehicle 2. More specifically, the controller 160 may transmit a communication message to the display device 50 and/or the audio device 60 so as to output a video message and/or an audio message for warning of the collision between the vehicle 1 and the rear vehicle 2.

The controller 160 may induce a driver to change a lane of the vehicle 1. The controller 160 may control the display device 50 and/or the audio device 60 so as to induce the lane change of the vehicle 1. More specifically, as shown in FIG. 5, the controller 160 may transmit the communication message to the display device 50 and/or the audio device 60 so as to output the image message and/or sound message for inducing the driver to perform the lane change of the vehicle 1.

Thereafter, the apparatus for assisting driving 100 determines whether the TTC with the rear object is less than or equal to a second reference time (1140).

Operation 1140 may be similar to operation 1020 illustrated in FIG. 3. For example, the controller 160 may determine, based on the relative position and relative speed of the rear vehicle 2, the TTC between the vehicle 1 and the rear vehicle 2, and determine whether the TTC with the rear object is less than or equal to the second reference time. The second reference time is smaller than the first reference time, and may be set experimentally or empirically.

In response to that the time remaining until the collision with the rear object is greater than the second reference time (No in operation 1140), the apparatus for assisting driving 100 may continue to warn the approach of the rear object and guide the lane change.

In response to that the time remaining until the collision with the rear object is less than or equal to the second reference time (YES in 1140), the apparatus for assisting driving 100 notifies the lane change and performs the lane change (1150).

For example, in response to that the time remaining until the collision with the rear vehicle 2 is less than or equal to the second reference time, the controller 160 may identify that the collision between the vehicle 1 and the rear vehicle 2 is imminent. The controller 160 may change lanes in order to prevent the collision between the vehicle 1 and the rear vehicle 2.

The controller 160 may notify the driver of the lane change of the vehicle 1. The controller 160 may control the display device 50 and/or the audio device 60 notifying the driver of the lane change of the vehicle 1. More specifically, the controller 160 may transmit the communication message to the display device 50 and/or the audio device 60 so as to output the image message and/or sound message notifying the lane change of the vehicle 1.

The controller 160 may control the steering device 40 to perform the lane change. The controller 160 may transmit a steering signal toward the free space to the steering device 40 in order to avoid the collision with the rear object of the vehicle 1. For example, the controller 160 may transmit the communication message to the steering device 40 to apply a first torque in a first direction. Thereafter, the controller 160 may transmit a steering signal to the steering device 40 so that the vehicle 1 travels in the changed lane as shown in FIG. 6. For example, the controller 160 may transmit the communication message to the steering device 40 to apply a second torque in a second direction.

Thereafter, the apparatus for assisting driving 100 determines whether the TTC with the rear object is less than or equal to a third reference time (1160).

Operation 1160 may be similar to operation 1020 illustrated in FIG. 3. For example, the controller 160 may determine, based on the relative position and relative speed of the rear vehicle 2, the TTC between the vehicle 1 and the rear vehicle 2 (TTC), and determine whether the TTC with the rear vehicle 2 is less than or equal to the third reference time. The third reference time is smaller than the second reference time, and may be set experimentally or empirically.

In response to that the time remaining until the collision with the rear object is greater than the third reference time (No in operation 1160), the apparatus for assisting driving 100 may notify the lane change and continue to perform the lane change.

In response to that the time remaining until the collision with the rear object is less than or equal to the third reference time (Yes in 1160), the apparatus for assisting driving 100 performs the emergency steering (1170).

For example, in response to that the time remaining until the collision with the rear vehicle 2 is less than or equal to the third reference time, the controller 160 may determine that the collision with the rear vehicle 2 will not be avoided by changing the lane after notifying the driver. The controller 160 may transmit a steering signal to the steering device 40 to apply the third torque without notifying the driver in order to avoid the collision with the rear vehicle 2. The magnitude of the third torque may be greater than that of the first torque.

By the third torque, the vehicle 1 is sharply steered toward the free space as shown in FIG. 7, so that the vehicle 1 may avoid the collision with the rear vehicle 2.

As described above, the apparatus for assisting driving 100 may identify a risk of a rear collision and may perform step-by-step steering operations to avoid the rear collision. As a result, the apparatus for assisting driving 100 may avoid the collision of the rear vehicle 2 as well as minimize inconvenience of the driver.

Figure 8:
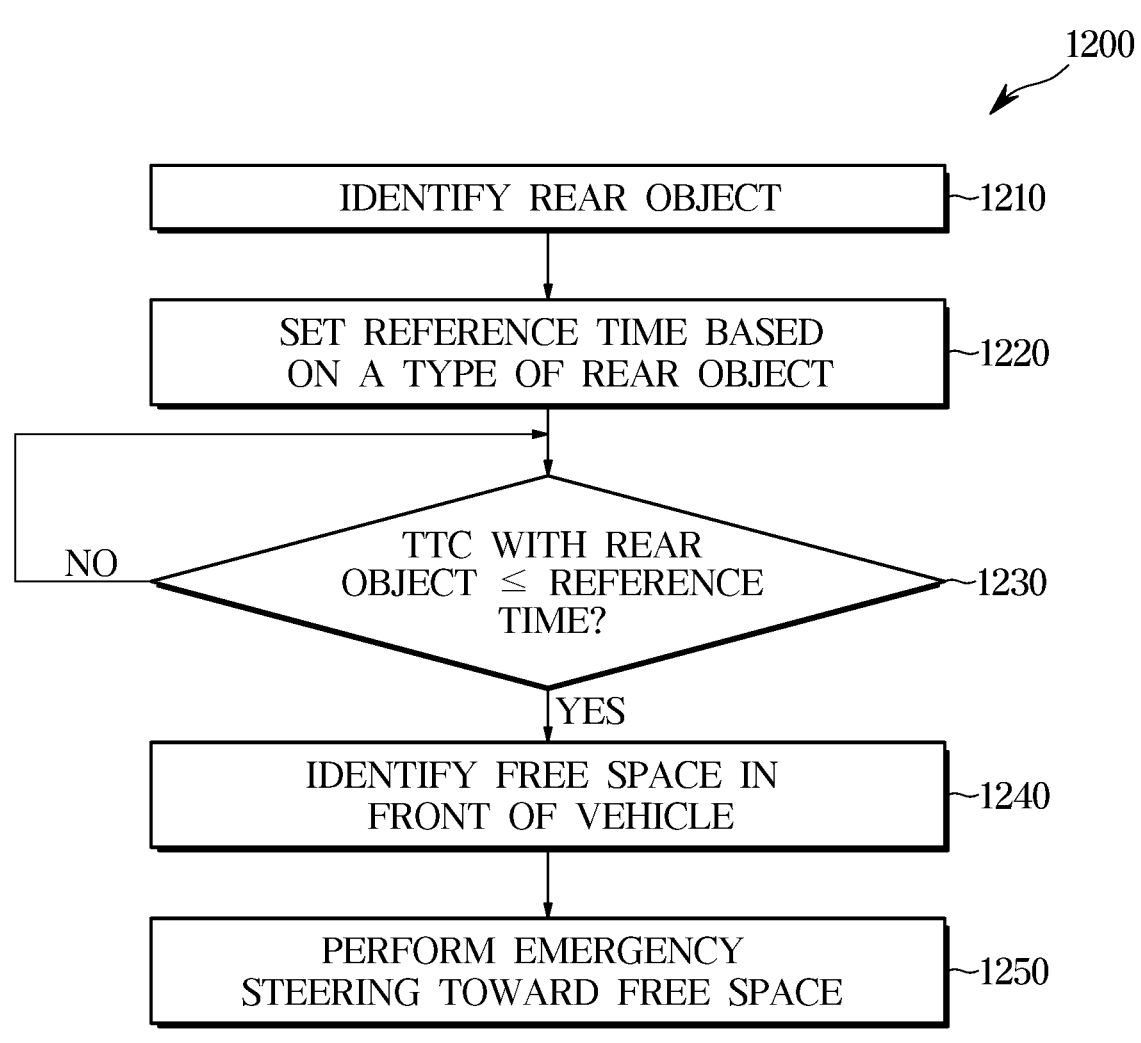
FIG. 8 shows the rear-end collision avoidance of the apparatus for assisting driving according to an embodiment of the disclosure.
Figure 9:
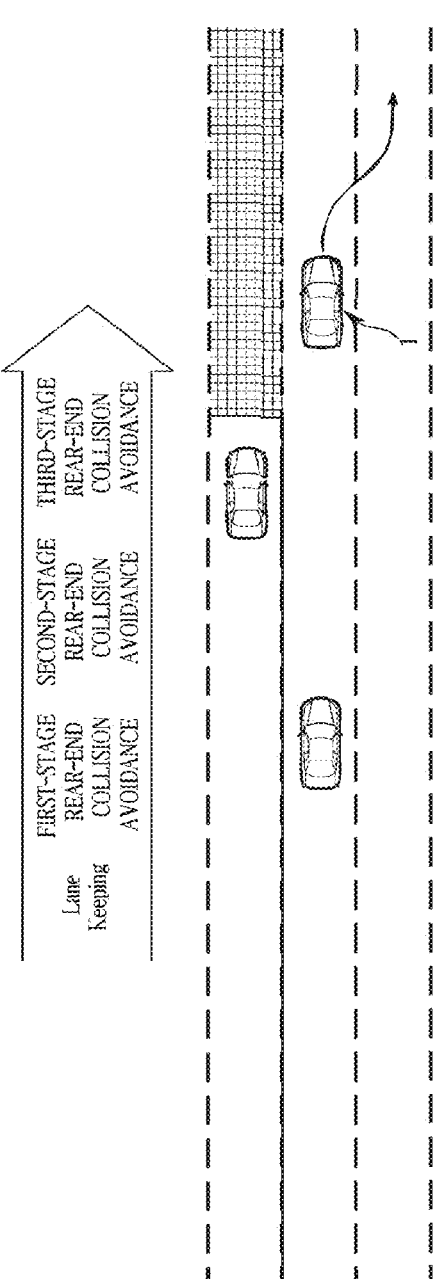
FIG. 9 shows a change in a reference time for the rear-end collision avoidance of the apparatus for assisting driving according to an embodiment of the disclosure.

FIG. 8 shows the rear-end collision avoidance of the apparatus for assisting driving according to an embodiment of the disclosure. FIG. 9 shows a change in a reference time for the rear-end collision avoidance of the apparatus for assisting driving according to an embodiment of the disclosure.

Referring to FIG. 8, the apparatus for assisting driving 100 identifies a rear object of the vehicle 1 (1210).

Operation 1210 may be the same as operation 1010 illustrated in FIG. 3.

The apparatus for assisting driving 100 sets the reference time based on the type of the rear object (1220).

For example, the controller 160 may set the reference time based on the type of the rear vehicle 2. The controller 160 may increase the reference time as the size or weight of the rear vehicle 2 increases. In response to that the rear vehicle 2 is a small vehicle, the controller 160 may set the reference time as a fourth reference time. Furthermore, in response to that the rear vehicle 2 is a large vehicle, the controller 160 may set the reference time as a fifth reference time longer than the fourth reference time.

By increasing the reference time as the size or weight of the rear vehicle 2 increases, the controller 160 may perform the emergency steering faster as the damage caused by the collision with the rear vehicle 2 increases.

The apparatus for assisting driving 100 identifies whether the TTC with the rear object is less than or equal to the reference time (1230).

Operation 1230 may be the same as operation 1020 illustrated in FIG. 3.

In response to that the TTC with the rear object is less than or equal to the reference time (Yes in 1230), the apparatus for assisting driving 100 identifies the free space in front of the vehicle 1 (1240).

Operation 1240 may be the same as operation 1030 illustrated in FIG. 3.

The apparatus for assisting driving 100 performs the emergency steering toward the free space (1250).

Operation 1250 may be the same as operation 1040 illustrated in FIG. 3.

As described above, embodiment of the disclosure may provide the apparatus and method for assisting driving of the vehicle capable of preventing the rear-end collision of the vehicle or reducing an impact caused by the rear-end collision.

On the other hand, embodiments of the disclosure may be implemented in the form of a recording medium storing instructions executable by a computer. Instructions may be stored in the form of program code, and when executed by a processor, may generate program modules to perform operations of the disclosed embodiments. The recording medium may be implemented as a computer-readable recording medium.

The computer-readable recording medium includes all kinds of recording media in which instructions which can be decoded by a computer are stored, for example, a read only memory (ROM), a random access memory (RAM), a magnetic tape, a magnetic disk, a flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. An apparatus for assisting driving of a vehicle, comprising:

a camera installed in the vehicle, having a rear field of view of the vehicle, and obtaining image data; and a controller configured to process the image data;

a memory configured to store the image data, a first reference time and a second reference time, the second reference time being smaller than the first reference time, wherein the controller is configured to:

identify a rear object that interferes with a driving of the vehicle and determine at least one of a size and a weight of the rear object based on processing the image data, adaptively adjust at least one of the first reference time and the second reference time based on the determined the size or the weight of the rear object, wherein the adaptively adjust comprises increasing at least one of the first reference time and the second reference time when it is determined that either the size or the weight of the rear object is relatively larger or heavier, in response to an increased risk of damage associated with the relatively larger or heavier rear object, control at least one of a display device and an audio device of the vehicle to output a message for inducing a lane change of the vehicle based on an expected collision time remaining until a collision between the vehicle and the rear object being less than or equal to the adaptively adjusted first reference time, and control a steering device of the vehicle to apply a first torque for performing the lane change of the vehicle based on the expected collision time being less than or equal to the adaptively adjusted second reference time that is smaller than the first reference time.

2. The apparatus of claim 1, wherein the controller is further configured to apply the first torque without outputting the message for inducing the lane change of the vehicle based on the expected collision time being less than or equal to the second reference time.

3. The apparatus of claim 1, wherein the controller is further configured to control the steering device of the vehicle to apply a second torque greater than the first torque based on the expected collision time being less than or equal to a third reference time that is smaller than the second reference time.

4. The apparatus of claim 1, wherein the controller is further configured to:

identify a free space on which the vehicle may travel in response to that the expected collision time is less than or equal to the first reference time, and control at least one of the display device and the audio device of the vehicle to output the message for inducing the lane change toward the free space.

5. The apparatus of claim 4, wherein the controller is configured to control the steering device of the vehicle to apply the first torque for performing the lane change toward the free space in response to that the expected collision time is less than or equal to the second reference time.

6. A method of assisting driving of a vehicle, the method comprising:

obtaining image data by a camera installed in the vehicle, the camera having a rear field of view of the vehicle;

identifying a rear object that interferes with a driving of the vehicle and determining at least one of a size and a weight of the rear object based on processing the image data;

adaptively adjusting at least one of a first reference time and a second reference time, stored in a memory, based on the determined the size or the weight of the rear object, wherein the adaptively adjusting comprises increasing the first reference time and the second reference time when it is determined that either the size or the weight of the rear object is relatively larger or heavier, in response to an increased risk of damage associated with the relatively larger or heavier rear object;

outputting a message for inducing a lane change of the vehicle based on an expected collision time remaining until a collision between the vehicle and the rear object being less than or equal to the adaptively adjusted first reference time; and applying a first torque for performing the lane change of the vehicle based on the expected collision time being less than or equal to the adaptively adjusted second reference time.

7. The method of claim 6, wherein applying of the first torque further comprises:

applying the first torque without outputting the message for inducing the lane change of the vehicle based on the expected collision time being less than or equal to the second reference time.

8. The method of claim 6, further comprises:

applying a second torque greater than the first torque based on the expected collision time being less than or equal to a third reference time that is smaller than the second reference time.

9. The method of claim 6, wherein outputting the message further comprises:

identifying a free space on which the vehicle may travel in response to that the expected collision time is less than or equal to the first reference time, and outputting the message for inducing the lane change towards the free space.

10. The method of claim 9, wherein applying the first torque further comprises:

applying the first torque for performing the lane change toward the free space in response to that the expected collision time is less than or equal to the second reference time.

11. A non-transitory computer-readable recording medium storing instructions, the instructions comprising:

obtaining image data by a camera installed in a vehicle and having a rear field of view of the vehicle;

identifying a rear object that interferes with a driving of the vehicle and determining at least one of a size and a weight of the rear object based on processing the image data;

adaptively adjusting at least one of a first reference time and a second reference time based on the determined the size or the weight of the rear object, wherein the adaptively adjusting comprises increasing at least one of the first reference time and the second reference time when it is determined that either the size or the weight of the rear object is relatively larger or heavier, in response to an increased risk of damage associated with the relatively larger or heavier rear object;

outputting a message for inducing a lane change of the vehicle based on an expected collision time remaining until a collision between the vehicle and the rear object being less than or equal to the adaptively adjusted first reference time; and applying a first torque for performing the lane change of the vehicle based on the expected collision time being less than or equal to the adaptively adjusted second reference time that is smaller than the first reference time.

12. The non-transitory computer-readable recording medium of claim 11, wherein the instruction further comprises applying the first torque without outputting the message for inducing the lane change of the vehicle based on the expected collision time being less than or equal to the second reference time.

13. The non-transitory computer-readable recording medium of claim 11, wherein the instruction further comprises applying a second torque greater than the first torque based on the expected collision time being less than or equal to a third reference time that is smaller than the second reference time.

14. The non-transitory computer-readable recording medium of claim 11, wherein the instruction further comprises:

identifying a free space on which the vehicle may travel in response to that the expected collision time is less than or equal to the first reference time, and outputting the message for inducing the lane change towards the free space.

15. The non-transitory computer-readable recording medium of claim 14, wherein the method further comprises applying the first torque for performing the lane change toward the free space in response to that the expected collision time is less than or equal to the second reference time.

* * * * *